UNITED STATES PATENT OFFICE.

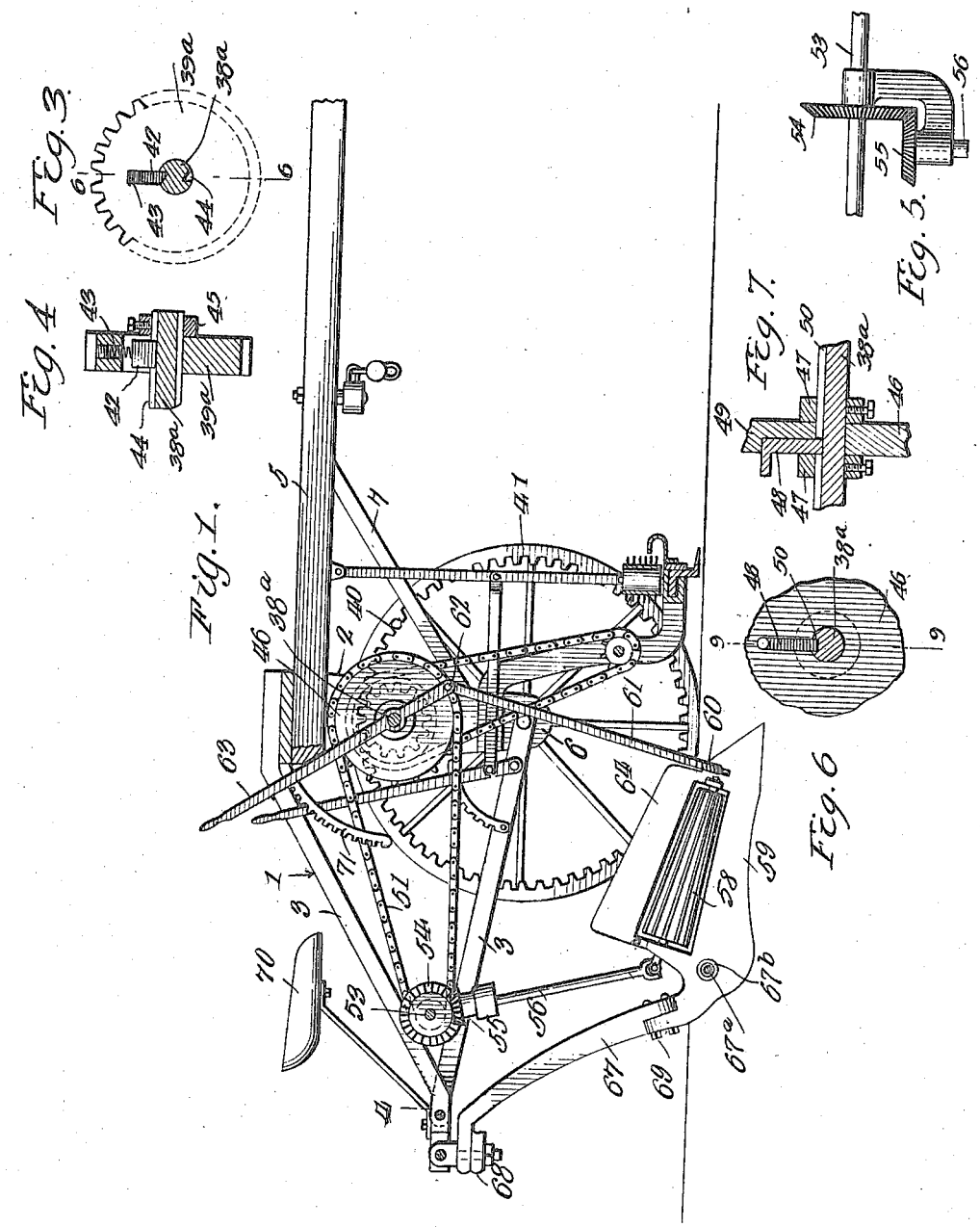

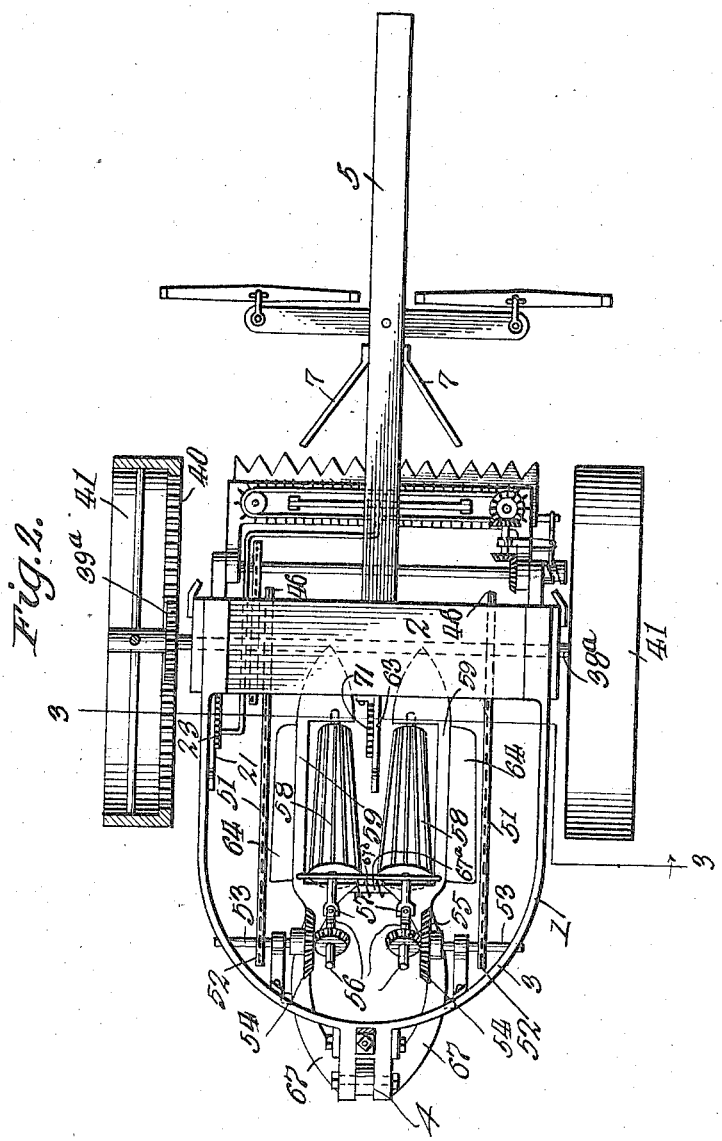

ERNEST HORATIO COPPINS, OF CHARLESTON, SOUTH CAROLINA.

BEET-HARVESTER.

1,263,529.   Specification of Letters Patent.   Patented Apr. 23, 1918.

Application filed September 7, 1916.  Serial No. 118,885.

*To all whom it may concern:*

Be it known that I, ERNEST H. COPPINS, a citizen of the United States, residing at Charleston, in the county of Charleston and State of South Carolina, have invented certain new and useful Improvements in Beet-Harvesters, of which the following is a specification.

My invention relates to beet harvesters.

The object of the invention is to provide for extracting the beets subsequent to a topping action; for removing adhering soil therefrom; for directing the extracted beets away from the machine; and for regulating the depth of the furrow made during extraction.

The above and additional objects are accomplished by such means as are illustrated in their preferred embodiment in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views in which:

Figure 1, is a view in longitudinal section of a beet harvester constructed in accordance with the present invention.

Fig. 2, is a top plan view, one of the wheels being shown in section.

Fig. 3, is a side elevation of one of the driving gears.

Fig. 4, is a section on line 6—6 of Fig. 5.

Fig. 5, is a side elevation illustrating a special form of bracket.

Fig. 6, is a fragmentary side elevation of the operating gear, and

Fig. 7, is a section on the line 9—9 of Fig. 6.

Referring to the drawings by numerals 1 designates as an entirety the machine frame which in its preferred embodiment may be said to consist of an upright frame portion 2 and a rearwardly extending frame portion 3 the latter portion comprising converging frame sections, each section terminating at a point 4 where they are attached. The vertical frame section or portion 2 has secured thereto in any suitable manner a draft tongue 5 and a depending frame portion 6, the former being braced as indicated at 7 and the latter positioned to extend forwardly for a purpose to be hereinafter fully described.

A shaft $38^a$ mounted in the frame is equipped with driven gears $39^a$, each gear being disposed to mesh with gear teeth 40 formed upon the inner periphery of the traction or supporting wheel 41 of the machine. To provide for the desired differential action, the gears $39^a$ are loosely mounted on the shaft $38^a$ and equipped with a pawl 42, spring pressed as indicated at 43, the pawl being engageable with grooves 44 formed in the shaft the grooves being of a formation whereby to permit of a loose turning of the gear $39^a$ upon the shaft in one direction yet causing the said gear to turn with the shaft during its movement in a counter direction. A collar 45 is provided to lock the gear against longitudinal movement upon the shaft.

Passing on to a detail description of the extracting mechanism, 46 designates the operating sprockets which are mounted on a shaft $38^a$. A collar 47 is positioned at each side of each sprocket to preclude its longitudinal movement relatively to the shaft. The sprockets are further provided with a key 48 positioned to fit a groove 49 therefor formed in one of the lateral faces of the sprockets and a key way 50 formed in the shaft $38^a$. When the key 48 is in the key way 50 and the groove 49 it is evident that the wheel 46 will rotate with the shaft. A chain 51 operates over each sprocket 46 and also over comparatively small sprockets 52, the latter being mounted upon shafts 53 positioned to extend transversely of the rearwardly extending portion 3 of the machine frame and in alinement. Shafts 53 also carry gears 54 which are adapted to mesh with like gears 55 mounted at the ends of depending shafts 56. Shafts 56 are divided, a universal joint 57 affording a connection between the shaft sections and each carries a substantially frusto-conical drum structure 58 which extends forwardly and downwardly in close proximity to the soil, plow blades 59 being arranged for penetrating engagement with the ground. The outer surface of each drum 58 is serrated or corrugated to grasp and elevate the beets when loosened by engagement between the drums and advancement of the plow blades 59. The forward ends of the shafts 56 are supported in a manner shown to advantage in Fig. 1 or by means of links 60 and 61, the latter having pivotal connection as at 62 with a lever 63 operable to raise and lower the drum should occasion demand. The lever 63 is fulcrumed intermediate its ends, the shaft 38ª acting as the fulcrum pin. Wings 64 extend laterally of the plow blades 59 to prevent movement of the extracted beets upwardly and over the sides or longitudinal edges of the said plow blades. During advancement of the machine it is apparent that the extracted beets will work toward the rear end of the plow blades where they are free to fall onto the ground subsequently to be collected in any suitable manner or by any suitable means.

The support for the plow blades 59 includes depending arms 67 each having a pivotal connection at a point 68 at the rear end of the frame portion 3 and a rod 67ª is slidably mounted at each end in the blades 59 whereby to support a spring 67ᵇ which is coiled about the rod, and bears at its ends against the blades to retain said blades in spaced relation. The arms 67 are movable toward and from each other to vary the space or distance between the plow blades 59. The point of connection between the arms 67 and the blades 59 is indicated at 69.

If desired, an operator's seat 70 may be provided and the lever 63 may be mounted to operate over a segment 71 therefor.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to when required, without sacrificing any of the advantages of my invention, as defined in the appended claims.

Having thus fully described my invention, what I claim as new and desire to secure by Letters Patent is:

1. In a beet harvesting machine, the combination with a wheeled frame, of extracting mechanism including divergent plow blades, a drum rotatable between the blades, means to rotate the drum through movement of the wheels; the said drum being engageable with the extracted beets to direct movement thereof toward the rear of the machine, and means to yieldingly maintain the blades in spaced relation.

2. In a beet harvesting machine, the combination with a wheeled frame, of a pair of longitudinally disposed divergent blades mounted for penetrating engagement with the soil to dig the beets acted on, a drum provided with a serrated surface, means maintaining the drum directly above and between the divergent blades, the serrated surface of the drum being engageable with the beets extracted to direct movement of the beets toward the rear of the machine, means interposed between the blades to yieldingly maintain them in spaced relation, means to rotate the drum during advancement of the machine and through rotation of the wheels, and means to vary the position of the drum relatively to the blades for the purpose specified.

In testimony whereof I affix my signature in presence of two witnesses.

ERNEST HORATIO COPPINS.

Witnesses:
 Thomas F. Fahy,
 Harry W. Dreher.

Copies of this patent may be obtained for five cents each, by addressing the "Commissioner of Patents, Washington, D. C."